United States Patent

[11] 3,586,044

[72] Inventor Lester C. Petersen
 Pasadena, Calif.
[21] Appl. No. 861,394
[22] Filed Sept. 26, 1969
[45] Patented June 22, 1971
[73] Assignee The United States of America as
 represented by the Secretary of the Navy

[54] SOLENOID FLOW CONTROL VALVE
 10 Claims, 7 Drawing Figs.
[52] U.S. Cl. ................................................. 137/590,
 251/139, 137/614.17
[51] Int. Cl. .................................................. F16k 11/10
[50] Field of Search ...................................... 137/590,
 592, 614.17; 251/139, 353, 340, 141; 114/20;
 136/100, 160, 159; 239/585, 456, 459

[56] References Cited
 UNITED STATES PATENTS
1,958,429  5/1934  Hartog ........................ 251/353 X
2,711,929  6/1955  Nielsen ......................... 239/456
2,984,422  5/1961  Vogt et al. .................... 239/456
3,012,087  12/1961 Billiard et al. ................ 114/20 X
3,154,040  10/1964 Neubert ....................... 136/100 R
3,321,177  5/1967  Fendel et al. ................. 251/139 X Primary Examiner—M. Cary Nelson
Assistant Examiner—R. B. Rothman
Attorneys—Richard S. Sciascia and Ervin F. Johnston ABSTRACT: A solenoid flow control valve including an intake fluid conduit having an inlet and an outlet; a valve stopper mounted to the intake fluid conduit; a solenoid coil mounted about the intake fluid conduit; a hollow solenoid plunger slidably mounted between the solenoid coil and the intake fluid conduit so that fluid flow will forcibly slide the plunger downstream and energization of the coil will electromagnetically force the plunger to slide upstream; and the plunger having valve seat means for increasing fluid flow through the conduit when the coil is deenergized and decreasing fluid flow when the coil is energized. The control valve may include a frame assembly having a top opening and an exhaust fluid inlet located therebelow; the intake fluid conduit having a flange which slidably mounts the conduit in the frame assembly and the flange having an exhaust fluid passageway above the exhaust fluid inlet; the top end of the intake fluid conduit having a cap for sealably plugging the top opening of the frame assembly when the intake fluid conduit is slid to a downstream position; and means for biasing the intake fluid conduit to the upstream position.

INVENTOR
LESTER C. PETERSEN
BY
ERVIN F. JOHNSTON
ATTORNEY.

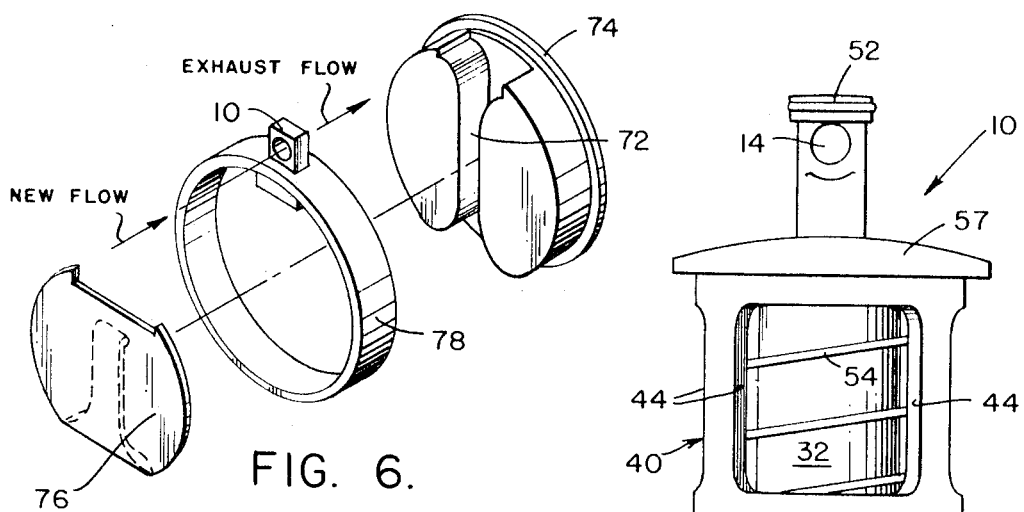
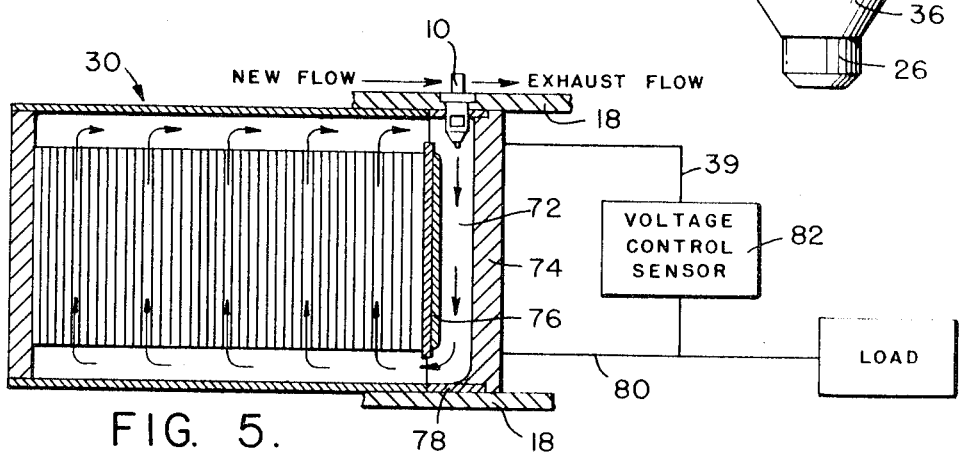
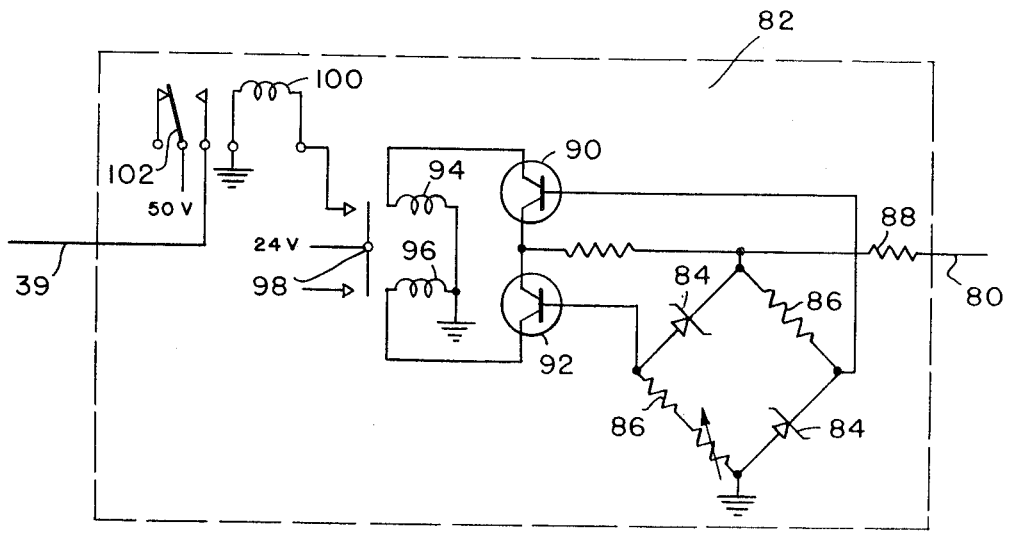

SOLENOID FLOW CONTROL VALVE

The use of an electrolyte-type sea water battery has become desirable for supplying power to underwater vehicles, such as a torpedo. It is usually important that the sea water battery have a substantially constant output voltage during its period of operation. By properly controlling the temperature of the electrolyte within the battery the desired voltage control can be attained. If the battery voltage should drop an increase in the temperature of the electrolyte will increase the voltage. If the original or old electrolyte in the battery is continuously recirculated without the addition of a new cooler electrolyte, such as sea water, the battery voltage will progressively increase and exceed the desired output voltage and lead to ultimate destruction of the battery. Accordingly, it is necessary for optimum utilization of such a battery to provide means for accomplishing the following purposes: (1) recirculating the electrolyte within the battery; (2) exhausting a portion of the old electrolyte; and (3) properly introducing a cooler new flow of electrolyte so as to maintain the output voltage of the battery at a desired level.

A previous method of recirculating electrolyte and obtaining a desired ratio of old electrolyte to new electrolyte has been to use a motor-driven pump in a conduit which connects the outlet and inlet ports of the battery along with a control valve in the new flow line. The control valve opens and closes the new flow line in response to a voltage control sensor which senses whether the output voltage of the battery is exceeding or falling below the desired level. The disadvantages of this arrangement are the necessity of providing energy from either the battery or some other source to run the pump, the size and weight of the motor to run the pump, and the requirement of a high-pressure rotating seal between the pump and the motor which presents a problem at deep ocean depths.

The present invention provides a unique solenoid flow control valve which eliminates the requirement of a motor-driven pump and, in combination with the battery voltage control sensor, accomplishes the desirable purposes of recirculating the battery electrolyte, exhausting a portion of the old electrolyte, and properly introducing a new cooler flow of electrolyte so as to maintain the output voltage of the battery at the desired level. This valve, which is highly compact and unitary, may include an intake fluid conduit having an inlet facing forward of the underwater vehicle and an outlet directed downwardly, a valve stopper mounted to the intake fluid conduit, and a solenoid coil mounted about the intake fluid conduit. A hollow solenoid plunger is slidably mounted between the solenoid coil and the intake fluid conduit so that fluid flow, which enters under ram pressure into the conduit inlet, will forcibly slide the plunger downstream and energization of the coil will electromagnetically force the plunger to slide upstream. The plunger has valve seat means for increasing the fluid flow through the conduit when the coil is deenergized and decreasing fluid flow when the coil is energized. The valve seat means may be formed at the downstream end of the plunger which end may also form an outlet nozzle. The intake fluid conduit may be slidably mounted within a frame assembly which has a top opening and an electrolyte exhaust fluid inlet located therebelow. Means may be provided for biasing the intake fluid conduit upwardly and at the top of the conduit there may be located a cap which is adapted to sealably plug the top frame opening of the assembly when it is desired to protect the top portion of the intake fluid conduit. Prior to operation the cap closes the opening and upon release the conduit moves upwardly to receive sea water. The nozzle end of the plunger may serve to recirculate the battery electrolyte by a venturi action, and the voltage control sensor appropriately controls the solenoid plunger to provide a desired ratio of old and new electrolytes to maintain the desired constant voltage.

An object of the present invention is to provide a solenoid flow control valve which is simpler in construction and operation than prior art solenoid flow control valves.

Another object is to provide a solenoid flow control valve wherein a single element of the movable part of the solenoid will serve the dual purpose of a nozzle and a valve seat.

A further object is to provide a solenoid flow control valve which does not require a motor-driven pump to recirculate and attain a proper ratio of old and new electrolyte within a sea water battery.

Still another object is to meet the objectives of the immediately preceding object and yet be located flush with the exterior surface of the vehicle until such time when its operation is desired.

Other objects and many of the attendant advantages of this invention will be readily appreciated as it becomes better understood by reference to the description and accompanying drawings which follow.

FIG. 4 is a side view of the valve.

FIG. 5 is a schematic vertical cross section of a sea water battery utilizing the present solenoid valve.

FIG. 6 is an exploded end view of the sea water battery illustrating the mounting of the solenoid valve.

FIG. 7 is a schematic illustration of circuitry for a voltage control sensor which senses output voltage of the battery and operates the solenoid of the valve.

Figure 3:
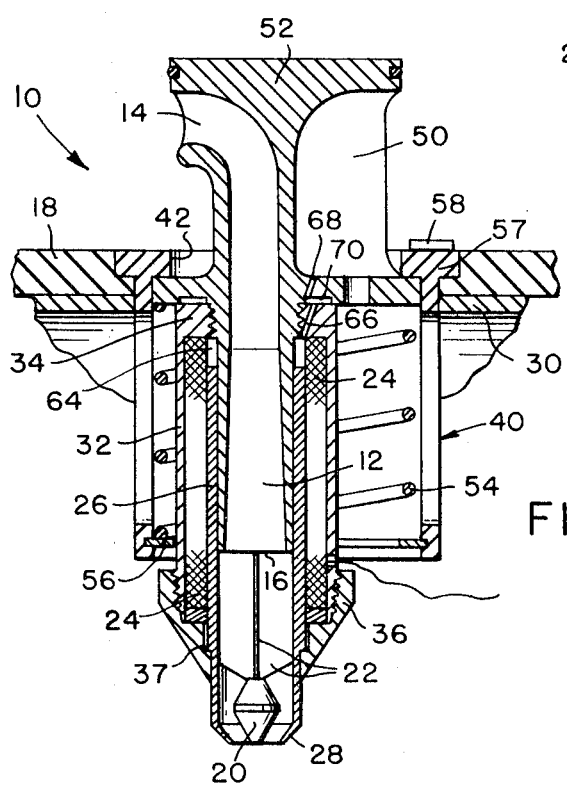
FIG. 3 is similar to FIG. 2 except the valve is in an open or high flow position.

Referring now to the drawings wherein like reference numerals designate like or similar parts throughout the several views there is shown in FIGS. 3 and 4 a solenoid flow control valve 10 having an intake fluid conduit 12 which has an inlet 14 and an outlet 16. The upstream end of the conduit 12 may bend substantially 90° in a forward direction with respect to an underwater vehicle 18 so that the inlet 14 will function as a scoop to ram sea water through the conduit 12 as the vehicle moves through the water.

A valve stopper 20 is mounted to the intake fluid conduit 12 and may be positioned in a location downstream from the conduit outlet 16. An exemplary means for mounting the valve stopper 20 in this position is a spider 22.

A solenoid coil 24 is mounted about the intake fluid conduit 12, and a hollow solenoid plunger 26 is slidably mounted between the solenoid coil 24 and the intake fluid conduit 12. In this manner fluid flow within the conduit will forcibly slide the plunger 26 downstream and, when desired, energization of the coil 24 will electromagnetically force the plunger to slide upstream. The plunger is shown in a downstream position in FIG. 3 and in an upstream position in FIG. 2. The plunger 26 may slidably engage both the conduit 12 and the solenoid 24. I have found it desirable to mount the solenoid 24 on a delrin tube (not shown) which will provide good sliding action with the plunger 26 and seal the inside surface of the solenoid from sea water. The remainder of the solenoid 24 may be sealed from the sea water by impregnation with any suitable material such as an epoxy.

The plunger 26 has valve seat means 28 which is cooperable with the valve stopper 20 for increasing fluid flow through the conduit 12 when the coil 24 is deenergized and decreasing fluid flow when the coil is energized. I have found it highly desirable to locate the valve seat means 28 at the downstream end of the plunger 26 so that the valve seat means also forms a nozzle for discharging the fluid for venturi action into a sea water battery 30 which will be described in more detail hereinafter. This venturi action within the battery will cause a desirable recirculation of the electrolyte therein. It should be understood that the valve seat 28 may either completely close or only partially restrict fluid flow when the plunger 26 is in the upstream position.

A sleeve 32 may be mounted about the solenoid coil 24 and may have an upstream inwardly projecting flange 34 which is fixedly connected to the intake fluid conduit 12 and which may form an upstream stop for the plunger 26. The sleeve has mounted at its downstream end an inwardly projecting means, such as a nipple 36, for slidably engaging the plunger 26 along its downstream portion. The nipple 36 and the plunger 26 may each have respective shoulders at 37 which are engageable with one another to provide a stop to downstream movement of the plunger 26. The sleeve 32 may be provided with a small aperture 38 for exiting a lead 39 from the solenoid 24.

In order to retract the upstream end of the conduit 12 to a flush position with respect to the outer skin 18 of an underwater vehicle I have found it desirable to provide a frame assembly 40 which has a top opening 42 and a plurality of exhaust fluid inlets 44 located therebelow. The intake fluid conduit 12 along with the components attached thereto may be slidably mounted within the frame assembly 40 by a transversely extending conduit flange 46. The flange 46 may have an exhaust fluid passageway 48 which is located above the exhaust fluid inlet 44 for discharging old electrolyte from the battery. In order to channel this old electrolyte I have found it desirable to provide the upstream end of the conduit 12 with a rearwardly extending projection 50 which forms a passageway for directing the old electrolyte in a direction opposite to the inlet 14. The upstream end of the conduit 12 and the projection 50 therefrom form a cap 52. This cap fits within the top opening 42 of the frame assembly and may be provided with an O-ring for making a seal therewith when the conduit 12 is slid to the downstream position. In this position the cap is flush with the outer surface of the underwater vehicle 18. Within the frame assembly 40 there may be mounted a means, such as a compression spring 54, for biasing the conduit 12 and the attached components toward an upstream position. The top of this spring may be retained by the conduit flange 46 and the bottom thereof may be retained by a retainer ring 56 located near the bottom of the frame assembly 40. The frame assembly may be provided with an outwardly projecting flange 57 which is adapted for recess within the wall of the underwater vehicle 18.

Figure 1:
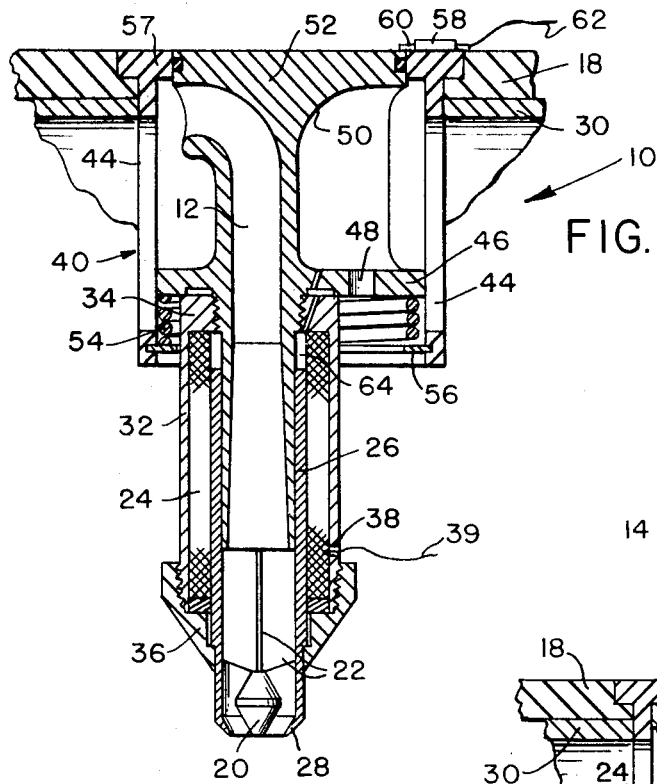
FIG. 1 is a vertical cross section of the solenoid valve in an unoperative position.

In order to retain the conduit 12 and the cap 52 in the downward position against the spring 54 a small hollow cylinder 58 may be mounted on top of the frame assembly 40 with a pin 60 which is adapted to extend therethrough and across the top of the cap 52. A lanyard 62 may be connected to the pin for pulling the pin away from the cap 52 when operation of the valve is desired. It is highly desirable to have the cap 52 in the downward position as shown in FIG. 1, so that the upstream end of the conduit 12 will not be damaged prior to the time for its operation.

As shown in FIG. 3 there is an annular space 64 where the plunger 26 slides between its upstream and downstream positions. In order to relieve pressure at the upstream end of this space 64 the flanges 34 and 46 are provided with small passageways 66 and 68 respectively which may be interconnected by an annular recess 70 in the bottom end of the flange 46.

There is shown in FIG. 5 an exemplary sea water battery 30 in which the solenoid valve 10 may be operated. The valve is mounted with its nozzle end protruding within a vertical passageway 72 at one end of the battery. This passageway may be formed by opposite facing plates 74 and 76, and an annular ring 78 located therebetween. The details of these elements, especially the passageway 72, are more clearly illustrated in FIG. 6. FIG. 6 also illustrates the mounting of the valve 10 in the ring 78.

The hot wire of the lead 39 from the solenoid 24 and the battery output lead 80 are connected to a voltage control sensor 82 which selectively controls the valve 10 so that a desired constant voltage output is received from the battery 30. An exemplary voltage control sensor is shown in FIG. 7. This circuit may include a balanced bridge which in turn may include Zener diodes 84 in one pair of legs and resistors 86 in the other pair of legs. The battery output voltage, after reduction by a resistor 88, is connected to one junction point of the bridge as well as to emitters of a pair of PNP transistors 90 and 92. The opposite junction point of the balanced bridge may be grounded. The remaining opposite junction points of the balanced bridge may be connected respectively to the bases of the transistors 90 and 92 and the collectors of the transistors are connected respectively to a pair of solenoid coils 94 and 96. The solenoid coils 94 and 96 operate a switch 98 which in turn is capable of applying a voltage to another solenoid coil 100. The latter solenoid coil operates a switch 102 which is capable of applying a voltage for actuating the solenoid 24 of the flow control wave 10.

When the voltage supplied to the balanced bridge falls below a desired level the bridge is imbalanced and current is fed to the transistors 90 and 92. This will cause the transistor 90 to shut off and the transistor 92 to be actuated so as to apply the voltage on switch 98 to the solenoid 100. The solenoid 100 in turn actuates the switch 102 to apply the operating voltage required to actuate the solenoid 24 of the flow control valve 10. This closes or restricts the flow into the battery 30. When the voltage applied to the balanced bridge exceeds the desired level the transistor 90 is actuated and the transistor 92 is shut off. The switch 98 then opens and breaks the circuit to solenoid 100 so as to stop current flow to the solenoid 24 of the flow control valve 10. This then causes the flow control valve to open and provide new electrolyte to the battery.

Figure 2:
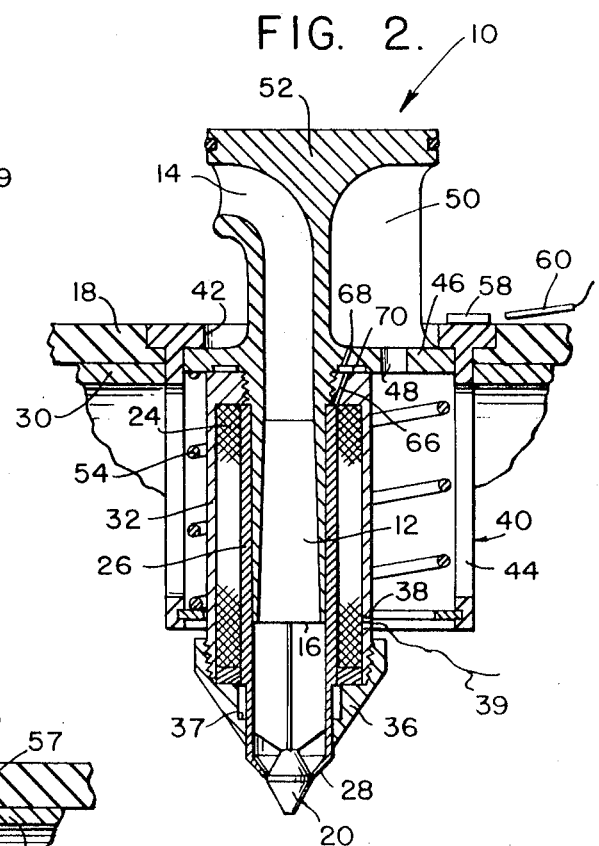
FIG. 2 is similar to FIG. 1 except the valve has been readied for operation, and also the valve is in a closed or low flow position.

In the operation of the invention the cap 52 of the conduit 12 is kept in a closed position as illustrated in FIG. 1, during transportation and storage. When operation of the battery 30 is desired the lanyard 62 is pulled so that spring 54 biases the cap 52 to the upward position, as illustrated in FIGS. 2 and 3. As the vehicle 18 moves through sea water the water is rammed into conduit 12 through inlet 14. This force acting on plunger 26 will force it to its downstream position, as illustrated in FIG. 3, and open the valve seat 28 with respect to the valve stopper 20. In this position sea water is being introduced at a maximum into the battery passageway 72 and venturi action is at its greatest for circulating electrolyte about the battery plates. The introduction of maximum sea water into the battery will occur when the voltage control sensor 82 senses that the output voltage of the battery is higher than a desired level. The cooler sea water will mix with the old electrolyte within the battery and lower its temperature so that the battery voltage will be reduced. Some of the electrolyte circulating along the top of the battery toward the passageway 72 will be discharged in an aft direction with respect to the vehicle 18 through frame openings 44, the flange passageway 48, and the passageway formed by the conduit projection 50. If the battery voltage falls below the desired level this indicates that the electrolyte must become warmer and the voltage control sensor 82 will, as shown in FIG. 2, operate the solenoid 24 to either close or restrict the passageway between the seat 28 and the valve stopper 20 depending upon the provision of the seating therebetween. In this manner the output voltage of the battery 30 will be maintained at a desired constant level.

It is now readily apparent that the solenoid flow control valve 10 is a surprisingly compact and unitary device for accomplishing many desirable functions. The valve is out of the way when the vehicle is transported, it does not require a motor-driven pump to recirculate water in a battery, and new electrolyte is received and old electrolyte is discharged without any substantial impedance to sea water flow about the vehicle. It should be noted that the components of the valve are kept to a minimum by making some of them serve more than one function. While this valve has been described for use with a sea water battery for operating an underwater vehicle it should be understood that it can be utilized in almost any situation where one fluid is introduced and another fluid is discharged from an area. Further, in a broad embodiment of the invention the valve may be utilized for simple valving functions without the frame assembly 44 and the other associated elements. In this instance the inlet 14 would not be directed in any particular direction and would be connected to a fluid pressure line.

I claim:

1. A solenoid flow control valve comprising:
an intake fluid conduit having an inlet and an outlet:
a valve stopper mounted to the intake fluid conduit;
a solenoid coil mounted about the intake fluid conduit;
a hollow solenoid plunger slidably mounted between the solenoid coil and the intake fluid conduit so that fluid flow will forcibly slide the plunger downstream and energization of the coil will electromagnetically force the plunger to slide upstream; and
the plunger having valve seat means for increasing fluid flow through the conduit when the coil is deenergized and decreasing fluid flow when the coil is energized.

2. A solenoid flow control valve as claimed in claim 1 including:
means mounting the valve stopper to the intake fluid conduit at a location downstream from said valve stopper;
the valve seat means being located at the extreme downstream end of the plunger and forming a nozzle for discharging the fluid from the intake fluid conduit; and
said valve seat means being located on a downstream side of the valve stopper so that fluid flow is increased when the valve seat means travels in a downstream direction and fluid flow is decreased when the valve seat means travels in an upstream direction.

3. A solenoid flow control valve comprising:
an intake fluid conduit having an inlet and an outlet;
a valve stopper;
means mounting the valve stopper to the intake fluid conduit at a location downstream therefrom;
a solenoid coil mounted about the intake fluid conduit;
a hollow solenoid plunger slidably mounted between the solenoid coil and the intake fluid conduit so that fluid flow will forcibly slide the plunger downstream and energization of the coil will electromagnetically force the plunger to slide upstream;
the plunger having valve seat means for increasing fluid flow through the conduit when the coil is deenergized and decreasing fluid flow when the coil is energized;
the valve seat means being located at the downstream end of the plunger and forming a nozzle for discharging the fluid from the intake fluid conduit;
a sleeve mounted about the solenoid coil having an upstream inwardly projecting flange which is fixedly connected to the intake fluid conduit and forms an upstream stop for the plunger;
said sleeve having at its downstream end inwardly projecting means for slidably engaging the plunger; and
said inwardly projecting means and said plunger each having a shoulder which are engageable with one another to stop downstream movement of the plunger.

4. A solenoid flow control valve comprising:
an intake fluid conduit having an inlet and an outlet;
a valve stopper mounted to the intake fluid conduit;
a solenoid coil mounted about the intake fluid conduit;
a hollow solenoid plunger slidably mounted between the solenoid coil and the intake fluid conduit so that fluid flow will forcibly slide the plunger downstream and energization of the coil will electromagnetically force the plunger to slide upstream;
the plunger having valve seat means for increasing fluid flow through the conduit when the coil is deenergized and decreasing fluid flow when the coil is energized;
a frame assembly having a top opening and an exhaust fluid inlet located therebelow; and
the intake fluid conduit being mounted in the frame and having a flange with an exhaust fluid passageway above the exhaust fluid inlet.

5. A solenoid flow control valve as claimed in claim 4 wherein: the upstream end of the intake fluid conduit bends substantially 90° in one direction so that the inlet of the conduit forms a scoop; and said conduit having a projection opposite the inlet scoop which forms a passageway for directing exhaust fluid from the exhaust fluid passageway.

6. A solenoid flow control valve as claimed in claim 5 wherein: the intake fluid conduit is slidably mounted in the frame assembly; and the upstream end of the intake fluid conduit and the projection therefrom forming a cap for sealably plugging the top opening of the frame assembly when the intake fluid conduit is slid to a downstream position.

7. A solenoid flow control valve as claimed in claim 6 including: means mounted in the frame assembly for biasing the intake fluid conduit toward an upstream position.

8. A solenoid flow control valve as claimed in claim 7 including: means mounting the valve stopper to the intake fluid conduit at a location downstream therefrom; and the valve seat means being located at the downstream end of the plunger and forming a nozzle for discharging the fluid from the intake fluid conduit.

9. A solenoid flow control valve as claimed in claim 8 including: a sleeve mounted about the solenoid coil having an upstream inwardly projecting flange which is fixedly connected to the intake fluid conduit and forms an upstream stop for the plunger; said sleeve having at its downstream end inwardly projecting means for slidably engaging the plunger; and said inwardly projecting means and said plunger each having a shoulder which are engageable with one another to stop downstream movement of the plunger.

10. A solenoid flow control valve as claimed in claim 9 wherein: the plunger slidably engages both the intake fluid conduit and the solenoid coil.